(12) United States Patent
Ljung (10) Patent No.: US 10,735,599 B2
(45) Date of Patent: Aug. 4, 2020

(54) UNLICENSED BAND USAGE MEASUREMENT REPORTING

(71) Applicant: Sony Corporation, Tokyo (JP)

(72) Inventor: Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 14/168,737

(22) Filed: Jan. 30, 2014

(65) Prior Publication Data

US 2015/0215471 A1    Jul. 30, 2015

(51) Int. Cl.
*H04M 15/00*   (2006.01)
*H04W 16/14*   (2009.01)
*H04W 72/08*   (2009.01)

(52) U.S. Cl.
CPC ........... *H04M 15/58* (2013.01); *H04W 16/14* (2013.01); *H04W 72/082* (2013.01)

(58) Field of Classification Search
CPC ..... H04W 16/14; H04W 72/04; H04W 72/08; H04W 88/06
USPC ......................................... 370/329; 455/405
See application file for complete search history.

(56) References Cited

U.S. PATENT DOCUMENTS

| 8,639,243 | B2 * | 1/2014 | Radulescu et al. ........... 455/434 |
| 2008/0214182 | A1 * | 9/2008 | Wang .................. H04B 7/2606 455/423 |
| 2010/0246506 | A1 * | 9/2010 | Krishnaswamy ... H04W 72/085 370/329 |
| 2011/0249642 | A1 * | 10/2011 | Song et al. ................... 370/329 |
| 2011/0287794 | A1 * | 11/2011 | Koskela et al. .............. 455/509 |
| 2012/0100884 | A1 * | 4/2012 | Radulescu et al. ........... 455/524 |
| 2012/0106370 | A1 * | 5/2012 | Radulescu et al. ........... 370/252 |
| 2012/0307744 | A1 | 12/2012 | Charbit et al. |
| 2013/0084910 | A1 * | 4/2013 | Suzuki et al. ................ 455/515 |

(Continued)

FOREIGN PATENT DOCUMENTS

WO    2012116489 A1    9/2012
WO    2013143053 A1    10/2013

OTHER PUBLICATIONS

International Search Report and Written Opinion; dated Apr. 10, 2015; issued in International Patent Application No. PCT/EP2014/079433.

(Continued)

*Primary Examiner* — Rafael Pérez-Gutiérrez
*Assistant Examiner* — Mark G. Pannell
(74) *Attorney, Agent, or Firm* — Tucker Ellis LLP (57) ABSTRACT

The invention is directed to allowing network base stations to receive information from mobile communication terminals about terminal-detected usage of unlicensed band utilization, e.g., due to uncoordinated short-range wireless communication usage in combination with LTE deployments in unlicensed bands. The present invention introduces additional information into automatic neighbor relation (ANR) reporting. The additional information comprises information associated with the unlicensed band utilization. The additional information enables a base station scheduler (e.g., an LTE base station scheduler) associated with a base station to take radio access technology (RAT) utilization other than cellular utilization (e.g., 2G, 3G, LTE, etc.) into account in order to decrease in-device coexistence issues and increase unlicensed band system capacity.

15 Claims, 4 Drawing Sheets

(56) References Cited

U.S. PATENT DOCUMENTS

| | | | |
|---|---|---|---|
| 2013/0137435 A1* | 5/2013 | Shi | H04W 36/20 |
| | | | 455/436 |
| 2013/0244718 A1* | 9/2013 | Lee et al. | 455/525 |
| 2013/0322390 A1* | 12/2013 | Xu et al. | 370/329 |
| 2014/0016537 A1* | 1/2014 | Khobare et al. | 370/315 |
| 2014/0031044 A1* | 1/2014 | Mazzarella | 455/440 |
| 2014/0044105 A1* | 2/2014 | Bontu et al. | 370/336 |
| 2014/0087715 A1* | 3/2014 | Suzuki et al. | 455/422.1 |
| 2014/0098753 A1* | 4/2014 | Kazmi et al. | 370/329 |
| 2015/0063323 A1* | 3/2015 | Sadek | H04W 16/14 |
| | | | 370/336 |
| 2015/0327101 A1* | 11/2015 | Hamilton | H04W 76/045 |
| | | | 370/252 |

OTHER PUBLICATIONS

ETSI 3GGP TS 36.331 V11.6.0 (Release 11), LTE; Evolved Universal Terrestrial Radio Access (E-UTRA); Radio Resource Control (RRC); Protocol specification; XP055226830.

European Patent Office; Communication pursuant to Article 94(3) EPC; dated Aug. 1, 2017; issued in European Patent Application No. 14 828 168.6.

* cited by examiner

UNLICENSED BAND USAGE MEASUREMENT REPORTING

BACKGROUND

Support for several radio access technologies can be included in a single mobile terminal. For example, the same terminal could be capable of using both cellular technologies (e.g., $2^{nd}$ generation (2G), $3^{rd}$ generation (3G), long-term or long-terminal evolution (LTE), etc.) as well as unlicensed spectrum technologies (e.g., wireless local area network (WLAN)). Of particular interest is whether cellular technologies, particularly LTE), should be allowed to use unlicensed frequencies, such as parts of the 5 GHz band. In doing so, there are specific techniques that would need to be introduced into LTE in order to ensure that the spectrum is utilized in a fair manner.

BRIEF SUMMARY

Embodiments of the invention are directed to a system, method, and computer program product for communicating data from a first device to a second device. An exemplary method comprises: receiving, by a mobile terminal, an unlicensed cell neighbor reporting request from a base station; forwarding the request to a modem control unit, wherein the modem control unit is comprised in the mobile terminal; requesting an unlicensed band measurement by a short-range wireless modem unit that uses the unlicensed band, wherein the short-range wireless modem unit is comprised in the mobile terminal; scanning, by the short-range wireless modem unit, signals on the unlicensed band; and transmitting, to the base station, a report on the scanned signals.

In some embodiments, the report includes at least one of a center frequency or list of frequencies for signals on the unlicensed band, a bandwidth of signals on the band, the mobile terminal's own usage of the band, or a signal strength of signals on the band.

In some embodiments, the method further comprises summarizing, by the modem control unit, the signals on the unlicensed band.

In some embodiments, the report is transmitted to the base station based on a defined schedule.

In some embodiments, the scanning further comprises filtering the signals based on at least one of a period of detection of the signals or a signal strength associated with the signals.

In some embodiments, the signals are associated with activity of a cell located in a proximity of the mobile terminal.

In some embodiments, the unlicensed band is associated with Wireless Local Area Network (WLAN) protocol.

In some embodiments, the licensed band comprises at least one of $2^{nd}$ generation (2G), $3^{rd}$ generation (3G), or long-term or long-terminal evolution (LTE) protocol.

In some embodiments, the transmitting step is performed by a cellular modem unit comprised in the mobile terminal.

In some embodiments, the cellular modem unit operates on a licensed band.

In some embodiments, the cellular modem unit and the short-range wireless modem unit are separate units.

In some embodiments, the cellular modem unit and the short-range wireless modem unit are comprised in a single unit.

In some embodiments, a method is provided for unlicensed band usage measurement requesting. The method comprises: requesting, by a base station, information from a mobile terminal about usage of an unlicensed band; and receiving, by the base station, information from the mobile terminal about usage of the unlicensed band, wherein the information is comprised in an automatic neighbor relation (ANR) report, wherein the information comprises first information associated with detected signals from at least one WLAN station in proximity of the mobile terminal, and second information associated with the mobile terminal's communication on at least one frequency associated with the at least one WLAN station.

In some embodiments, a mobile terminal is provided for responding to an unlicensed cell neighbor reporting request. The mobile terminal comprises: a modem control unit for receiving an unlicensed cell neighbor reporting request; a short-range wireless modem unit for scanning signals on an unlicensed band; and a cellular modem unit for transmitting a report comprising a summary of the scanned signals, and a summary of the short-range wireless modem unit's activity on the unlicensed band.

In some embodiments, the mobile terminal comprises a mobile phone, a mobile computing device, a mobile television, a laptop computer, a smart screen, a tablet computer, a portable desktop computer, an e-reader, eyewear, a scanner, a portable media device, a gaming device, a camera, a watch, or a band or other wearable device.

In some embodiments, a computer program product is provided for executing the various processes or methods described herein. The computer program product comprises a non-transitory computer-readable medium comprising code configured to perform the various processes or methods described herein.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to allowing network base stations to receive information from mobile communication terminals about terminal-detected usage of unlicensed band utilization, e.g., due to uncoordinated short-range wireless usage in combination with LTE deployments in unlicensed bands. In some embodiments, the unlicensed band may refer to any other short-range wireless communication protocol (e.g., near-field communication (NFC), Bluetooth, etc.) in addition to or as an alternative to short-range wireless communication. The present invention introduces additional information into ANR reporting. The additional information comprises information associated with the unlicensed band utilization. The additional information enables a base station scheduler (e.g., an LTE base station scheduler) associated with a base station to take radio access technology (RAT) utilization other than cellular utilization (e.g., 2G, 3G, LTE, etc.) into account in order to decrease in-device coexistence issues and increase unlicensed band system capacity.

Coordinating radio spectrum utilization could be achieved by using a "listen before talk" procedure in unlicensed frequency bands. One could also utilize time division solutions between WLAN and LTE by means of trying to avoid simultaneous utilization of both systems at the same time. For example, the terminal can ask the LTE network base station for certain silent periods (discontinues transmission) in order to mitigate any coexistence issues.

However, since the above concepts would work better if the base station scheduler is aware of the current usage of other radio access systems (e.g., other than cellular systems) in the unlicensed bands, the present invention is directed to further reducing the likelihood of simultaneous ongoing data sessions using both LTE and WLAN at the same time in the same frequency band. Achieving this reduction in likelihood of simultaneous ongoing data sessions using both LTE and WLAN at the same time in the same frequency band would improve the spectrum utilization of the unlicensed frequency band.

In an LTE framework, a mobile terminal is allocated data resources based on base station (eNodeB) packet scheduling. The present invention proposes a methodology to include information about terminal-detected usage of other radio access technologies into the terminal feedback channel that is directed to the LTE base station. In this manner, the base station scheduler can take this information into account in a terminal-specific frequency scheduling procedure. The present invention assumes that networks for cellular technologies such as 2G/3G/LTE are operating in licensed bands, and therefore in a given area, the allocated bandwidth is specifically used by a limited number of base stations.

The present invention is directed to enabling a base station in a wireless communication system to be able to repeatedly receive information about terminal-detected utilization of interfering radio access systems associated with a certain frequency band. Information is provided both in terms of what terminals detect about general usage of a certain band, but also specifically if the particular terminal is using that band with another wireless protocol (e.g., WLAN) or not.

Figure 1:
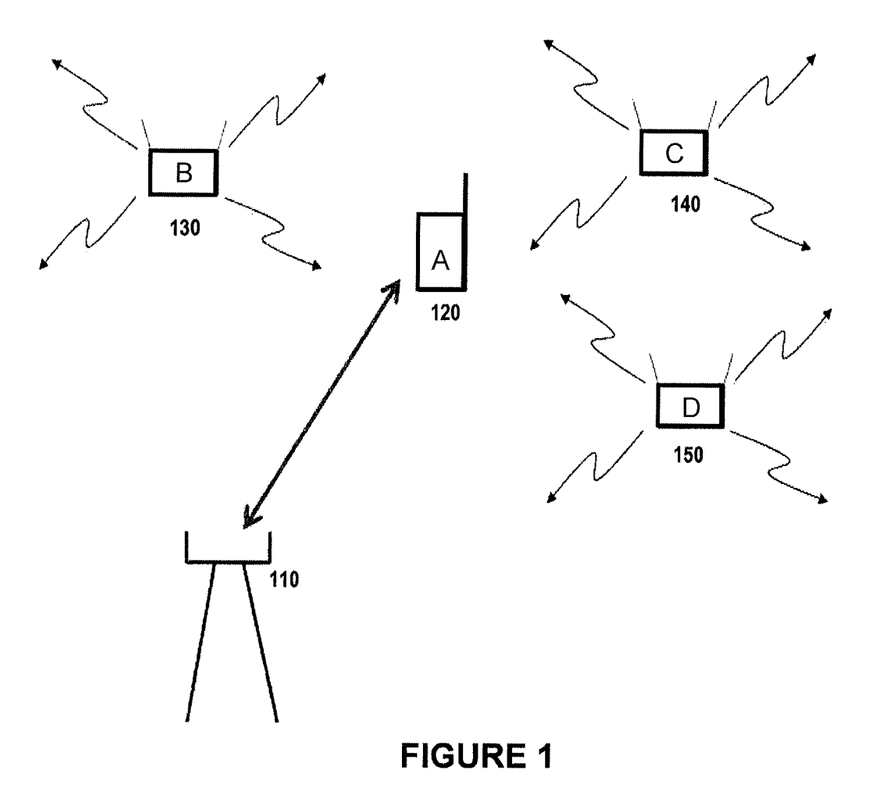
FIG. 1 presents an exemplary network environment for unlicensed band usage measurement reporting, in accordance with embodiments of the present invention.

Referring now to FIG. 1, FIG. 1 illustrates a network environment where the base station 110 receives a report from terminal A 120 about otherwise unknown usage of a specific unlicensed band. Terminal A 120 reports to the base station 110 information on detected signals from WLAN stations B 130, C 140, and D 150. The report also includes information regarding whether terminal A 120 is in active communication on frequencies associated with WLAN stations B 130, C 140, and D 150.

The present invention is directed to including information on detected signals from WLAN stations and information regarding whether a terminal is in active communication on frequencies associated with the WLAN stations in a new reporting functionality within the automatic neighbor relation (ANR) reporting concept. Currently, the existing ANR concept (e.g., in LTE standard) is based on terminals reporting detection of cells that belong to the same operator, with the purpose of ensuring that base stations maintain an updated list of available neighbor cell relations without manual neighbor list handling. The present invention proposes to extend the ANR functionality to allow a terminal to report terminal-experienced utilization of other potentially interfering usage of the unlicensed spectrum. This may be referred to as unlicensed cell neighbor reporting (uCell reporting), and is part of the extended ANR functionality. As used herein, a cell or cell station may be any source of signals.

The additional reporting data in an uCell report response includes one or more of the following data fields for each detected unlicensed short-range wireless communication signal or cell—(1) center frequency and/or a list of frequencies defined for each band (e.g., 6-8 bits), (2) bandwidth of the band (e.g., 4 bits), (3) terminal's own usage of the band (e.g., 1 bit), and (4) detected signal strength of the band (e.g., 4 bits).

Figure 2:
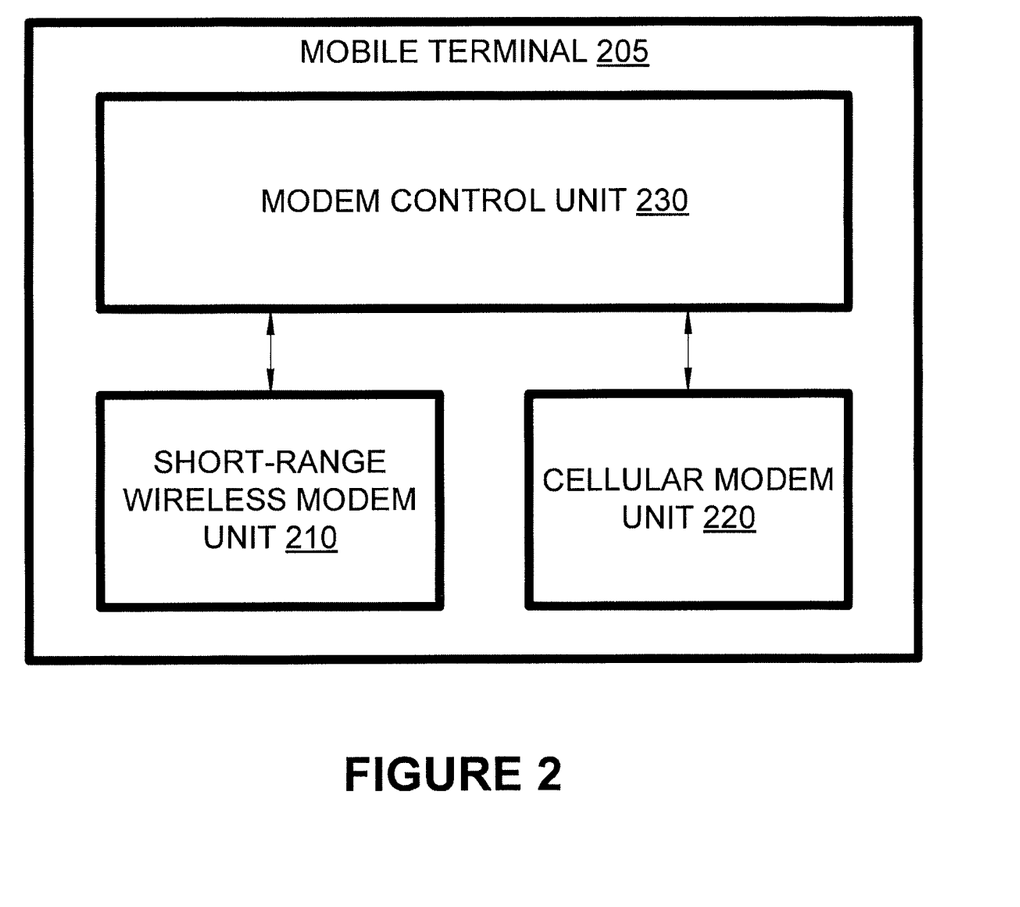
FIG. 2 presents an exemplary block diagram for unlicensed band usage measurement reporting, in accordance with embodiments of the present invention.

The functionality for this invention within a single mobile terminal 205 is illustrated in FIG. 2. In FIG. 2, a conceptual block diagram is shown, where a short-range wireless modem unit 210 and a cellular modem unit 220 are both connected to a general modem control unit 230 (e.g., realized as an application processor entity). When the cellular modem unit 220 receives a uCell report request for an unlicensed band as part of ANR signaling from a base station, the request is forwarded to the modem control unit 230. The modem control unit 230 identifies both the short-range wireless modem unit 210 and the cellular modem unit 220 as capable of performing uCell measurements (because both are capable of potentially using the unlicensed band), and hence requests the measurements from both units. Subsequently, the short-range wireless modem 210 scans and reports to the modem control unit 230 detected usage on the unlicensed band. The data associated with the detected usage on the unlicensed band is summarized at the modem control unit 230 and then sent to the cellular modem unit 220. The cellular modem unit 220 communicates the data to the base station from which the uCell report request was received. This enables the base station to take the mobile terminal's utilization into account in order to decrease intra-terminal coexistence issues and in order to increase unlicensed band capacity. Other implementations are possible, e.g., with both cellular and short-range wireless modem units within the same unit in the single terminal. In such an implementation, measurements and reporting could be conducted within the same unit.

Other possibilities for signaling the detection of unlicensed band utilization are possible. For example, the signaling could be included as part of a defined schedule (e.g., scheduling signaling or access grant signaling). In scheduling signaling, signaling for the detection of unlicensed band utilization is done on a predetermined schedule. In access grant signaling for the detection of unlicensed band utilization is done signaling is performed based on a received access message (e.g., from the mobile terminal or base station). The signaling described in this invention has been designed to offer a suitable compromise between low-signaling load (i.e., trying to minimize the amount of bandwidth is used for signaling) and reasonable-reporting frequency (i.e., ensuring that sufficient reporting is conducted in order to keep the base station updated with the mobile terminal's frequency utilization). The signaling described herein also keeps the base station in full control of the timeframe associated with receiving the ANR report.

The terminal could, within its measurement procedure, apply filtering of detected cells. For example, this filtering could be achieved by reporting signals associated with signal strengths greater than or equal to a certain threshold signal strength or associated with periods of continuous detection greater than or equal to a certain period. The threshold signal strength or period may be increased in the event that the terminal's mobility is equal to or greater than predetermined mobility. The reason for doing such filtering would be that high mobility severely impacts the usefulness of neighboring cell measurements described herein because of the relative environment variation during one signaling round trip delay.

Figure 3:
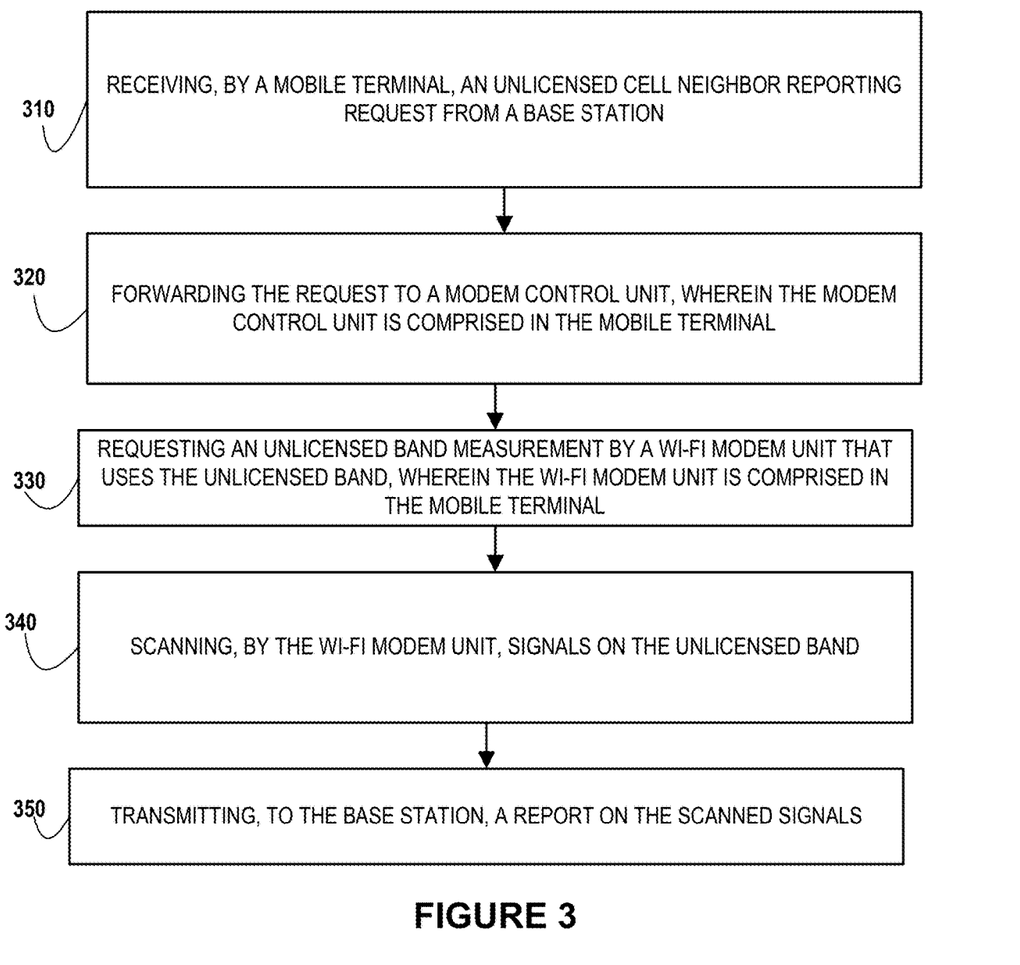
FIG. 3 presents an exemplary process flow, in accordance with embodiments of the present invention.

Referring now to FIG. 3, FIG. 3 describes an exemplary process flow for responding to an unlicensed cell neighbor reporting request. At step 310, the process flow comprises receiving, by a mobile terminal, an unlicensed cell neighbor reporting request from a base station. At step 320, the process flow comprises forwarding the request to a modem control unit, wherein the modem control unit is comprised in the mobile terminal. At step 330, the process flow comprises requesting an unlicensed band (e.g., associated with WLAN protocol) measurement by a short-range wireless modem unit that uses the unlicensed band, wherein the short-range wireless modem unit is comprised in the mobile terminal.

Referring now to FIG. 3, FIG. 3 describes an exemplary process flow for responding to an unlicensed cell neighbor reporting request. At step 310, the process flow comprises receiving, by a mobile terminal, an unlicensed cell neighbor reporting request from a base station. At step 320, the process flow comprises forwarding the request to a modem control unit, wherein the modem control unit is comprised in the mobile terminal. At step 330, the process flow comprises requesting an unlicensed band (e.g., associated with WLAN protocol) measurement by a short-range wireless modem unit that uses the unlicensed band, wherein the short-range wireless modem unit is comprised in the mobile terminal.

At step 340, the process flow comprises scanning, by the short-range wireless modem unit, signals on the unlicensed band. As described previously, in some embodiments, scanning further comprises filtering the signals based on at least one of a period of detection of the signals or a signal strength associated with the signals. The signals are associated with activity of a cell located in proximity of the mobile terminal (e.g., less than or equal to a certain distance from the mobile terminal). The signals on the unlicensed band may be summarized by the modem control unit.

At step 350, the process flow comprises transmitting, to the base station, a report on the scanned signals. In some embodiments, the report is transmitted to the base station on a defined schedule. The report may be transmitted by a cellular modem unit comprised in the mobile terminal. The cellular modem unit operates on a licensed band (e.g., 2G, 3G, LTE, etc.). The cellular modem unit and the short-range wireless modem unit are either separate units or are comprised in the same unit. As described previously, the report transmitted to the base station includes at least one of a center frequency or list of frequencies for signals on the unlicensed band, a bandwidth of signals on the band, the mobile terminal's own usage of the band, or a signal strength of signals on the band.

As described herein, the mobile terminal includes a modem control unit for receiving an unlicensed cell neighbor reporting request, a short-range wireless modem unit for scanning signals on an unlicensed band, and a cellular modem unit for transmitting a report comprising both a summary of the scanned signals and a summary of the short-range wireless modem unit's activity on the unlicensed band.

Figure 4:
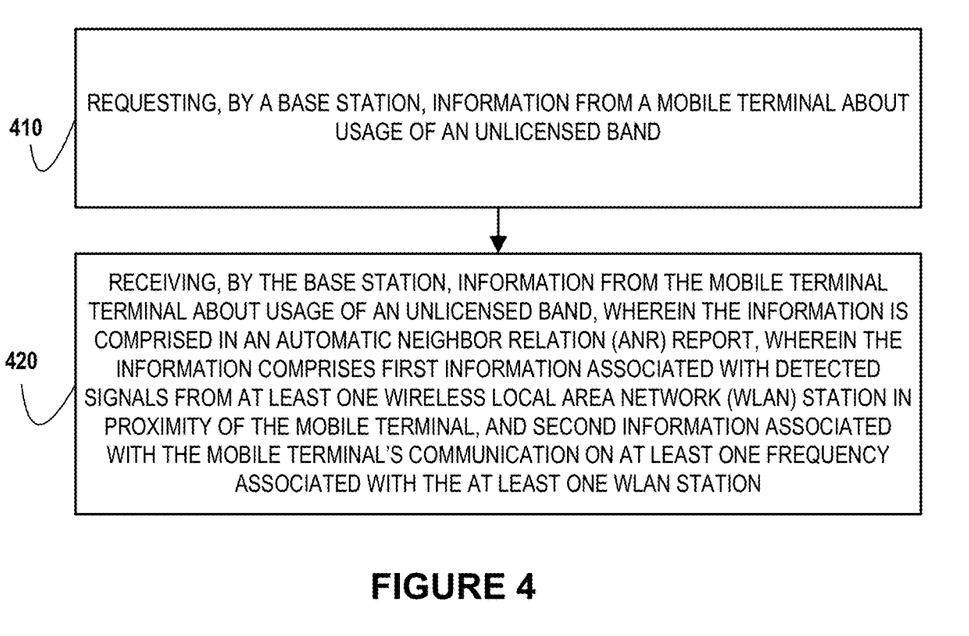
FIG. 4 presents another exemplary process flow, in accordance with embodiments of the present invention.

Referring now to FIG. 4, FIG. 4 describes an exemplary process flow for unlicensed band usage measurement requesting. At step 410, the process flow comprises requesting, by a base station, information from a mobile terminal about usage of an unlicensed band. At step 420, the process flow comprises receiving, by the base station, information from the mobile terminal about usage of an unlicensed band. The information is comprised in an automatic neighbor relation (ANR) report. The information comprises first information associated with detected signals from at least one WLAN station in proximity of the mobile terminal. The information also comprises second information associated with the mobile terminal's communication on at least one frequency associated with the at least one WLAN station.

The invention is not limited to any particular types of terminals (e.g., mobile terminals). As used herein, a terminal may also be referred to as a system, device, or client. Examples of terminals include mobile phones or other mobile computing devices, mobile televisions, laptop computers, smart screens, tablet computers or tablets, portable desktop computers, e-readers, eyewear, scanners, portable media devices, gaming devices, cameras or other image-capturing devices, watches, bands (e.g., wristbands) or other wearable devices, or other portable or non-portable computing or non-computing devices.

Each terminal, base station, or cell described herein is a computing device that comprises a processor, a memory, and a module stored in the memory, executable by the processor, and configured to perform the various processes described herein. Each processor described herein generally includes circuitry for implementing audio, visual, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for responding to an unlicensed cell neighbor reporting request, the method comprising:

receiving, by a mobile terminal, a request for unlicensed cell neighbor reporting from a cellular network base station, wherein the request is part of a procedure that requests detection of neighboring cells associated with the base station;

forwarding the request to a modem control unit, wherein the modem control unit is comprised in the mobile terminal;

requesting an unlicensed band measurement by a short-range wireless modem unit that uses the unlicensed band, wherein the short-range wireless modem unit is comprised in the mobile terminal;

scanning, by the short-range wireless modem unit, the unlicensed band to detect one or more signals; and transmitting, to the cellular network base station, one or more reports on the detected signals, wherein at least one of the reports is part of the procedure that requests detection of licensed neighboring cells associated with the base station and, wherein the one or more reports include (i) a summary of the detected signals on the unlicensed band, and (ii) an indication of which frequency bands associated with the detected signals the mobile terminal is actively transmitting data using a non-cellular network protocol, wherein the cellular network base station uses information in the report in determining mobile terminal-specific frequency scheduling for cellular network communication by the mobile terminal.

2. The method of claim 1, further comprising summarizing, by the modem control unit, the signals on the unlicensed band.

3. The method of claim 1, wherein the report is transmitted to the base station based on a defined schedule.

4. The method of claim 1, wherein the signals are associated with activity of a cell located in proximity of the mobile terminal.

5. The method of claim 1, wherein the unlicensed band is associated with wireless local area network (WLAN) protocol.

6. The method of claim 1, wherein the transmitting step is performed by a cellular modem unit comprised in the mobile terminal.

7. The method of claim 6, wherein the cellular modem unit operates on a licensed band.

8. The method of claim 7, wherein the licensed band comprises at least one of $2^{nd}$ generation (2G), $3^{rd}$ generation (3G), or long-terminal evolution (LTE) protocol.

9. The method of claim 6, wherein the cellular modem unit and the short-range wireless modem unit are separate units.

10. The method of claim 6, wherein the cellular modem unit and the short-range wireless modem unit are comprised in a single unit.

11. The method of claim 1, wherein the report further includes at least one of (iii) a center frequency or list of frequencies for signals on the unlicensed band, (iv) a bandwidth of signals on the band, or (v) or a signal strength of signals on the band.

12. The method of claim 1, further comprising filtering the detected signals based on at least one of a period of detection of the signals or a signal strength associated with the signals.

13. A method for unlicensed band usage measurement requesting and usage, the method comprising:

requesting, by a cellular network base station, information from a mobile terminal about usage of an unlicensed band, wherein the request is part of a procedure that requests detection of neighboring cells associated with the base station;

receiving, by the cellular network base station, information from the mobile terminal about usage of the unlicensed band, wherein the information is comprised in one or more reports, wherein at least one of the reports is part of the procedure that requests detection of neighboring cells associated with the base station, wherein the information comprises first information associated with detected signals from at least one wireless local area network (WLAN) station in proximity of the mobile terminal, and second information that indicates which frequency bands associated with the detected signals the mobile terminal is actively transmitting data using a non-cellular network protocol; and using, by the cellular network base station, the information in determining mobile terminal-specific frequency scheduling for cellular network communication by the mobile terminal.

14. A mobile terminal for responding to an unlicensed cell neighbor reporting request, the mobile terminal comprising:

a modem control unit for receiving, from a cellular network base station, an unlicensed cell neighbor reporting request, wherein the request is part of a procedure that requests detection of neighboring cells associated with the base station;

a short-range wireless modem unit for scanning an unlicensed band to detect one or more signals; and a cellular modem unit for transmitting, to the cellular network base station, one or more reports comprising (i) a summary of the detected signals on the unlicensed band, and (ii) an indication of which frequency bands associated with the detected unlicensed signals the mobile terminal is actively transmitting data using a non-cellular network protocol, wherein at least one of the reports is part of the procedure that requests detection of neighboring cells associated with the base station, wherein the cellular network base station uses information in the report in determining mobile terminal-specific frequency scheduling for cellular network communication by the mobile terminal.

15. The mobile terminal of claim 14, wherein the mobile terminal comprises a mobile phone, a mobile computing device, a mobile television, a laptop computer, a smart screen, a tablet computer, a portable desktop computer, eyewear, an e-reader, a scanner, a portable media device, a gaming device, a camera, a watch, or a band or other wearable device.

* * * * *